(12) United States Patent
Bastani et al.

(10) Patent No.: US 12,069,230 B2
(45) Date of Patent: Aug. 20, 2024

(54) TEMPORAL FOVEATED RENDERING

(71) Applicant: Meta Platforms Technologies, LLC, Menlo Park, CA (US)

(72) Inventors: Behnam Bastani, Palo Alto, CA (US); Steven Paul Lansel, East Palo Alto, CA (US); Todd Douglas Keeler, Fremont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 208 days.

(21) Appl. No.: 17/132,228

(22) Filed: Dec. 23, 2020

(65) Prior Publication Data

US 2022/0201271 A1    Jun. 23, 2022

(51) Int. Cl.
*H04N 13/332*  (2018.01)
*G06T 7/269*  (2017.01)

(52) U.S. Cl.
CPC ........... *H04N 13/332* (2018.05); *G06T 7/269* (2017.01); *G06T 2207/10016* (2013.01)

(58) Field of Classification Search
CPC ........... G06T 11/00; G06T 2207/10016; G06T 7/269; H04N 13/332; H04N 13/344; H04N 13/00; H04N 19/00; H04N 2213/00
See application file for complete search history.

(56) References Cited

U.S. PATENT DOCUMENTS

| | | | |
|---|---|---|---|
| 6,266,443 B1 * | 7/2001 | Vetro | G06T 7/143 382/199 |
| 10,054,796 B2 * | 8/2018 | Bickerstaff | G02B 27/0179 |
| 10,110,914 B1 * | 10/2018 | Chen | H04N 19/54 |
| 10,152,775 B1 * | 12/2018 | Bellows | G06T 5/006 |
| 10,187,607 B1 * | 1/2019 | Delachanal | H04N 5/23258 |
| 10,198,612 B1 * | 2/2019 | Hsu | G06T 7/73 |
| 10,712,817 B1 * | 7/2020 | Rönngren | G09G 5/391 |
| 10,771,774 B1 * | 9/2020 | Melakari | H04N 13/383 |
| 11,064,387 B1 * | 7/2021 | Movshovich | H04N 13/194 |
| 11,109,011 B2 * | 8/2021 | Horvitz | H04N 21/234363 |
| 11,269,406 B1 * | 3/2022 | Sztuk | G06F 3/011 |
| 2016/0366392 A1 * | 12/2016 | Raghoebardajal | H04N 13/332 |
| 2017/0155885 A1 * | 6/2017 | Selstad | H04N 13/341 |
| 2017/0206625 A1 * | 7/2017 | Fainstain | G06T 7/20 |

(Continued)

OTHER PUBLICATIONS

International Search Report and Written Opinion for International Application No. PCT/US2021/058129, mailed Mar. 4, 2022, 9 pages.

*Primary Examiner* — Peter D Le
(74) *Attorney, Agent, or Firm* — Morgan, Lewis & Bockius LLP

(57) ABSTRACT

In one embodiment, a method includes accessing a first image corresponding to a first frame of a video stream, where the first image has complete pixel information, rendering a provisional image corresponding to a second frame of the video stream subsequent to the first frame, where the provisional image has a first area with complete pixel information and a second area with incomplete pixel information, generating a predicted image corresponding to the second frame by re-projecting at least an area of the first image according to one or more warping parameters, and generating a second image corresponding to the second frame by compositing the rendered provisional image and the predicted image.

20 Claims, 9 Drawing Sheets

(56) References Cited

U.S. PATENT DOCUMENTS

| | | | |
|---|---|---|---|
| 2017/0243324 A1* | 8/2017 | Mierle | G02B 27/017 |
| 2017/0308992 A1* | 10/2017 | Chalom | G06V 40/171 |
| 2017/0345220 A1* | 11/2017 | Bates | H04N 13/366 |
| 2018/0075820 A1* | 3/2018 | Hicks | G06F 3/14 |
| 2018/0081429 A1 | 3/2018 | Akenine-Moller et al. | |
| 2018/0146189 A1* | 5/2018 | Park | H04N 13/344 |
| 2018/0165878 A1* | 6/2018 | Khan | G06T 19/006 |
| 2018/0220119 A1* | 8/2018 | Horvitz | H04N 21/234363 |
| 2018/0286105 A1* | 10/2018 | Surti | H04N 5/23212 |
| 2018/0324332 A1* | 11/2018 | Konttori | H04N 13/156 |
| 2018/0350036 A1* | 12/2018 | VanReenen | H04N 1/3935 |
| 2019/0037244 A1 | 1/2019 | Melkote Krishnaprasad et al. | |
| 2019/0138094 A1* | 5/2019 | Miettinen | G02B 27/0093 |
| 2019/0149809 A1* | 5/2019 | Chen | H04N 13/139 |
| | | | 348/53 |
| 2019/0187482 A1* | 6/2019 | Lanman | G02B 26/105 |
| 2019/0258314 A1* | 8/2019 | Ollila | G02B 27/0172 |
| 2020/0111195 A1* | 4/2020 | Vlachos | G06F 3/147 |
| 2020/0167999 A1* | 5/2020 | Schmit | G06F 3/013 |
| 2020/0169753 A1* | 5/2020 | Xiu | H04N 19/61 |
| 2020/0234408 A1* | 7/2020 | Melakari | G06T 5/006 |
| 2020/0380744 A1* | 12/2020 | Valient | G06T 11/40 |
| 2021/0027752 A1* | 1/2021 | Holmes | G06F 3/147 |
| 2021/0089119 A1* | 3/2021 | Riguer | H04L 65/764 |
| 2021/0104063 A1* | 4/2021 | Kassis | G06V 40/18 |
| 2021/0192681 A1* | 6/2021 | Mironov | G06T 3/0056 |
| 2021/0258555 A1* | 8/2021 | Leiby | G06F 3/0346 |
| 2021/0278678 A1* | 9/2021 | Brannan | G06T 3/40 |

\* cited by examiner

TEMPORAL FOVEATED RENDERING

TECHNICAL FIELD

This disclosure generally relates to artificial-reality systems, and in particular, related to efficient rendering for artificial-reality systems.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for achieving Graphics Processing Unit (GPU) savings by reducing rendering frequency in the peripheral view of a fixed or eye tracked display (e.g., traditional 2D display, HMD, etc.). Foveated rendering is a rendering technique to reduce the rendering workload by reducing the image quality in the peripheral vision. Foveated rendering may be performed spatially to reduce the rendered resolution or pixel density in the peripheral region of each frame. Temporal Foveated Rendering described herein is a method of achieving GPU savings by reducing rendering frequency in the peripheral view. Depending on the desired rendering frequency, Temporal foveated rendering could save GPU compute for half of the frames by only rendering a small 'inset' and leaving a peripheral 'outset' un-rendered for every other frame. The outset area may be filled in using a previously rendered full frame.

In particular embodiments, a computing device may access a first image corresponding to a first frame of a video stream. The first image may comprise a plurality of sub-areas. Pixel densities for the sub-areas may be different from each other. The computing device may render a provisional image corresponding to a second frame of the video stream subsequent to the first frame. The provisional image may comprise a first area with complete pixel information and a second area with incomplete pixel information. In particular embodiments, the second area of the provisional image may not be rendered. The computing device may generate a predicted image corresponding to the second frame by re-projecting at least an area of the first image according to one or more warping parameters. The one or more warping parameters may comprise space warping parameters and time warping parameters. The computing device may generate a second image corresponding to the second frame by compositing the rendered provisional image and the predicted image. In particular embodiments, a rendered area in the provisional image and the re-projected area of the predicted image have an overlap region. The computing device may blend pixels within the overlap region while compositing the rendered provisional image and the predicted image. In particular embodiments, the video stream may be a stereoscopic video stream. The computing device may alternate generating an image corresponding to a frame of the video stream by compositing the rendered provisional image and the predicted image between eyes. The computing device may render a whole image corresponding to the frame for the first eye while the computing device may generate an image corresponding to the frame for a second eye by compositing the rendered provisional image and the predicted image.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
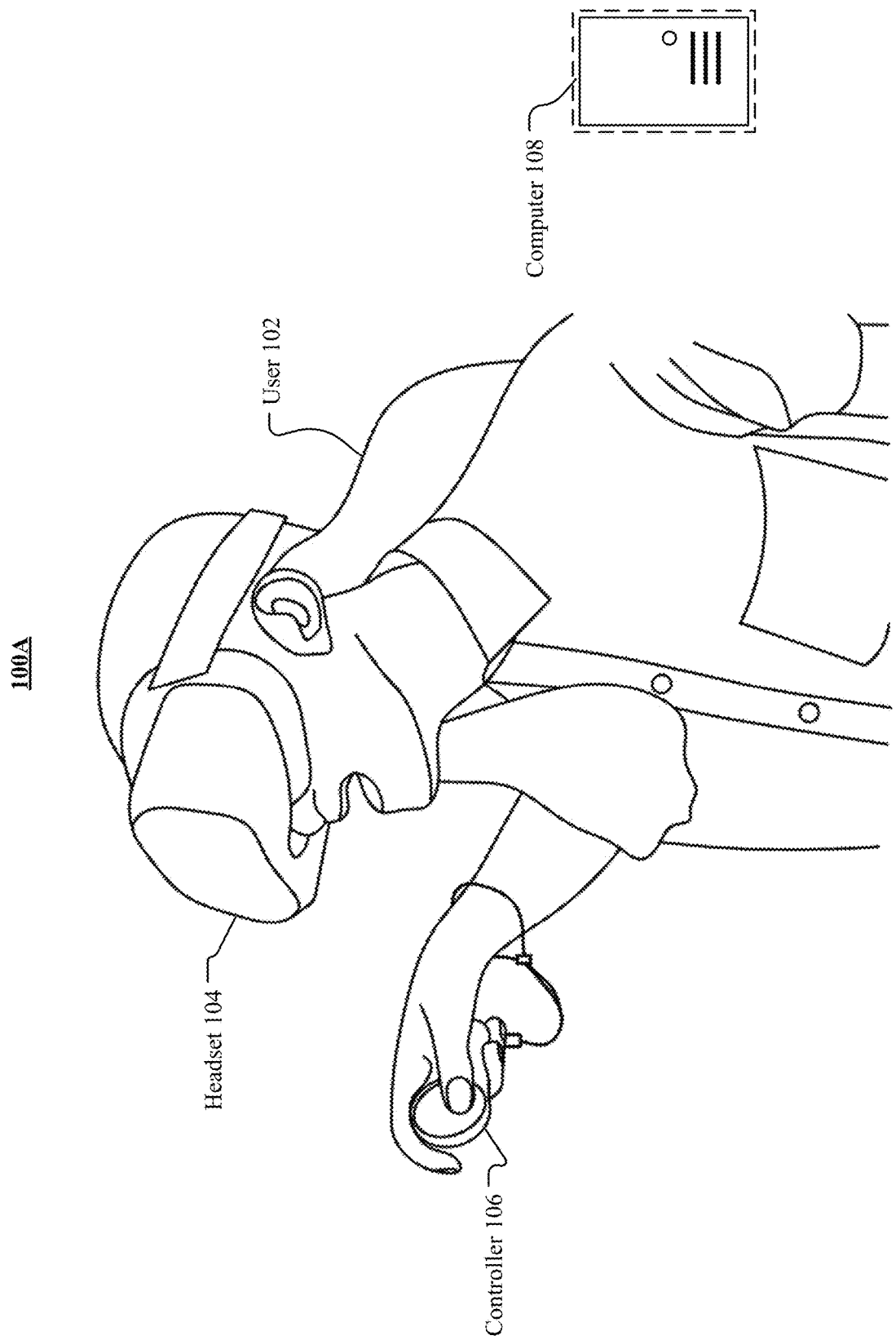
FIG. 1A illustrates an example artificial reality system.

FIG. 1A illustrates an example artificial reality system 100A. In particular embodiments, the artificial reality system 100A may comprise a headset 104, a controller 106, and a computing device 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may include a microphone to capture voice input from the user 102. The headset 104 may be referred as a head-mounted display (HMD). The controller 106 may comprise a trackpad and one or more buttons. The controller 106 may receive inputs from the user 102 and relay the inputs to the computing device 108. The controller 106 may also provide haptic feedback to the user 102. The computing device 108 may be connected to the headset 104 and the controller 106 through cables or wireless connections. The computing device 108 may control the headset 104 and the controller 106 to provide the artificial reality content to and receive inputs from the user 102. The computing device 108 may be a standalone host computing device, an on-board computing device integrated with the headset 104, a mobile device, or any other hardware platform capable of providing artificial reality content to and receiving inputs from the user 102.

Figure 1B:
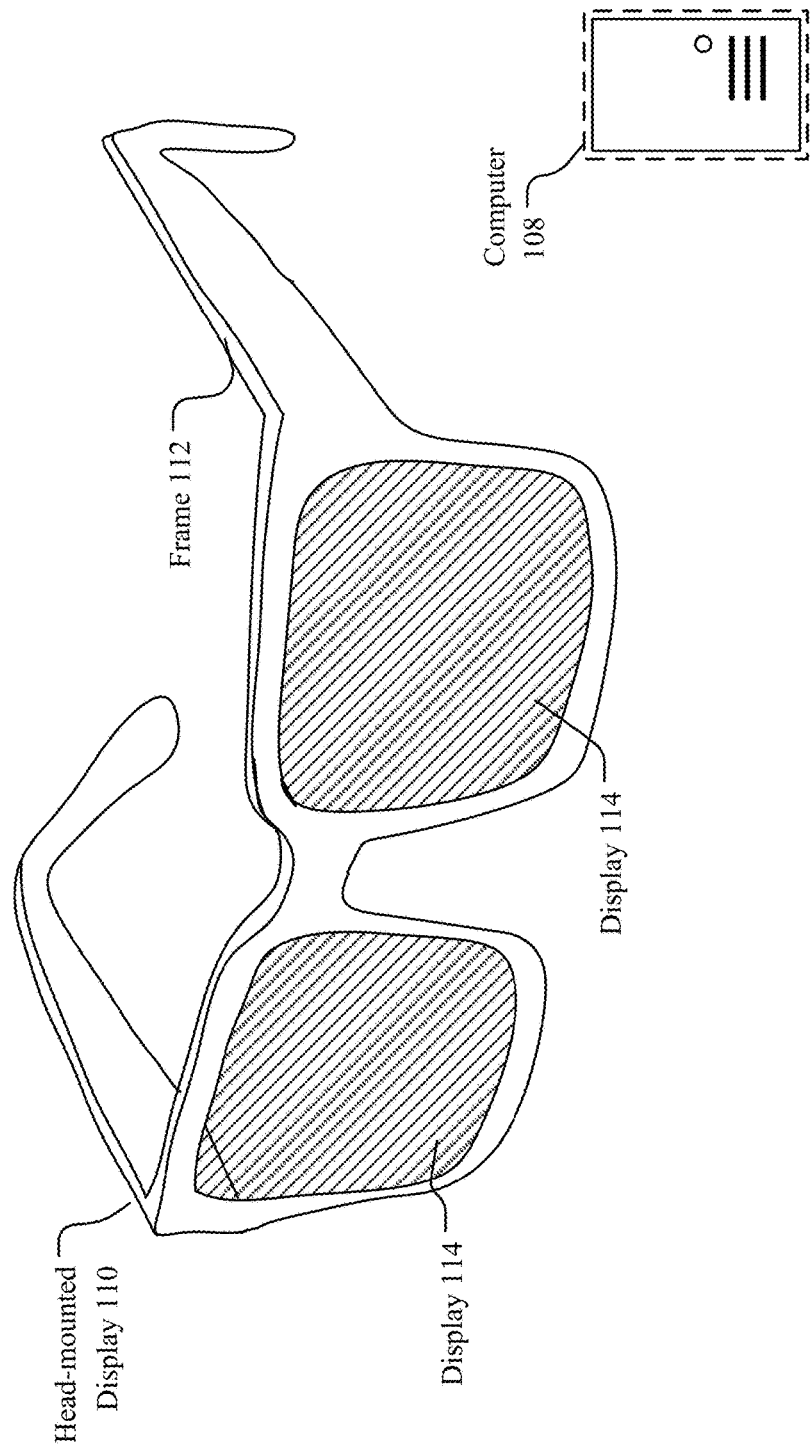
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing device 108. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The HMD 110 may include a microphone to capture voice input from the user. The augmented reality system 100B may further include a controller comprising a trackpad and one or more buttons. The controller may receive inputs from users and relay the inputs to the computing device 108. The controller may also provide haptic feedback to users. The computing device 108 may be connected to the HMD 110 and the controller through cables or wireless connections. The computing device 108 may control the HMD 110 and the controller to provide the augmented reality content to and receive inputs from users. The computing device 108 may be a standalone host computer device, an on-board computer device integrated with the HMD 110, a mobile device, or any other hardware platform capable of providing artificial reality content to and receiving inputs from users.

In particular embodiments, the computing device 108 may access a first image corresponding to a first frame of a video stream. The first image may comprise a plurality of sub-areas. Pixel densities for the sub-areas may be different from each other. The computing device 108 may render a provisional image corresponding to a second frame of the video stream subsequent to the first frame. The provisional image may comprise a first area with complete pixel information and a second area with incomplete pixel information. In particular embodiments, the second area of the provisional image may not be rendered. The computing device 108 may generate a predicted image corresponding to the second frame by re-projecting at least an area of the first image according to one or more warping parameters. The one or more warping parameters may comprise space warping parameters and time warping parameters. The computing device 108 may generate a second image corresponding to the second frame by compositing the rendered provisional image and the predicted image. In particular embodiments, a rendered area in the provisional image and the re-projected area of the predicted image have an overlap region. The computing device 108 may blend pixels within the overlap region while compositing the rendered provisional image and the predicted image. In particular embodiments, the video stream may be a stereoscopic video stream. The computing device 108 may alternate generating an image corresponding to a frame of the video stream by compositing the rendered provisional image and the predicted image between eyes. The computing device 108 may render a whole image corresponding to the frame for the first eye while the computing device 108 may generate an image corresponding to the frame for a second eye by compositing the rendered provisional image and the predicted image. Although this disclosure describes generating an image for a frame by compositing a rendered provisional image and a predicted image generated by re-projecting an image corresponding to a previous frame in a particular manner, this disclosure contemplates generating an image for a frame by compositing a rendered provisional image and a predicted image generated by re-projecting an image corresponding to a previous frame in any suitable manner.

Figure 2:
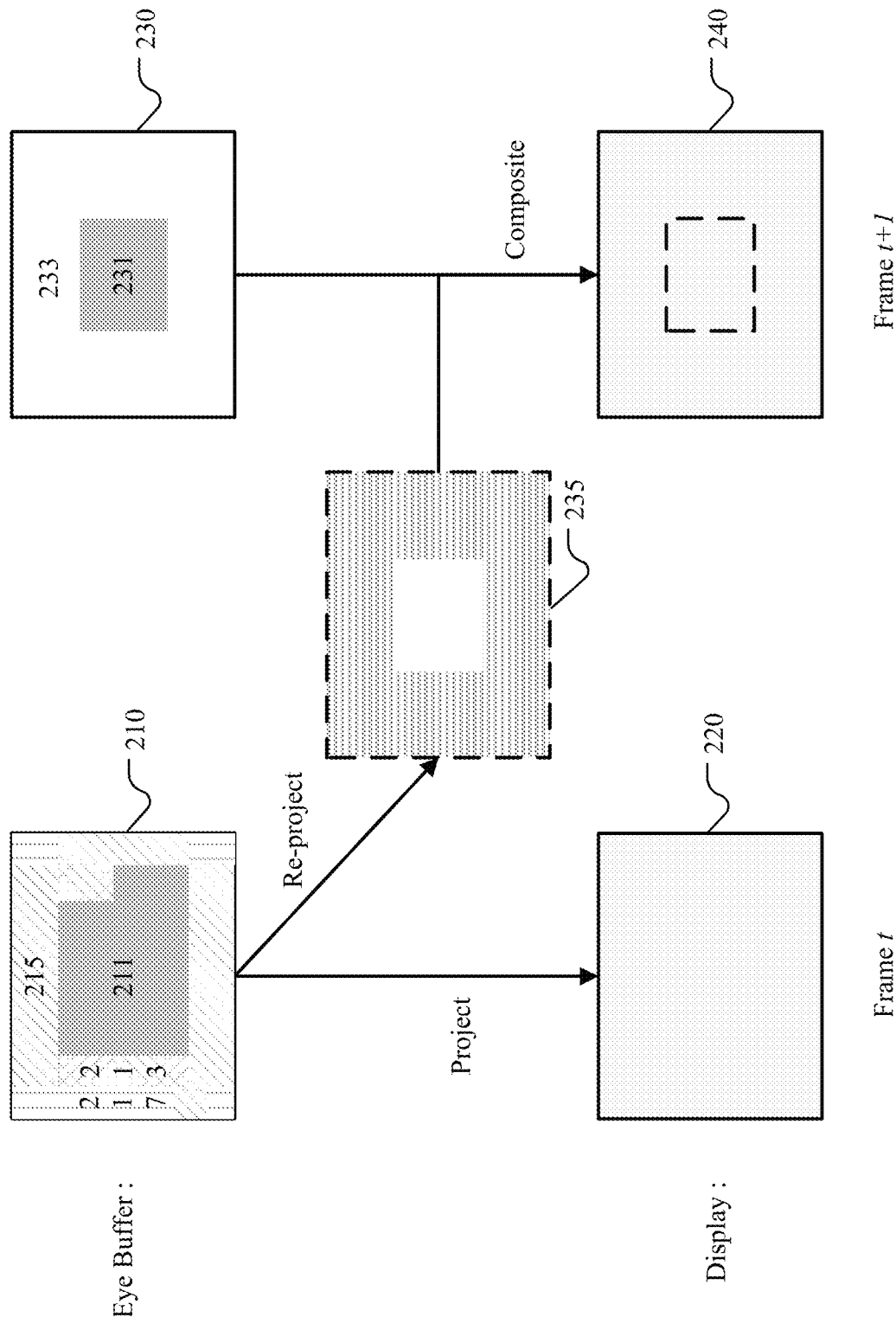
FIG. 2 illustrates an example temporal foveated rendering process.

In particular embodiments, the computing device 108 may access a first image corresponding to a first frame of a video stream. The first image may comprise a plurality of sub-areas. Pixel densities for the sub-areas may be different from each other. The first image may have complete pixel information after post-rendering processes. FIG. 2 illustrates an example temporal foveated rendering process. As an example and not by way of limitation, illustrated in FIG. 2, the computing device 108 may render a first image 210 corresponding to frame t. The first frame 210 may comprise a plurality of sub-areas 211, 213, 215 and 217. The computing device 108 may render the first image 210 with a spatial foveated rendering technique, where each sub-area of the first image 210 may be rendered at a corresponding pixel density. In the example illustrated in FIG. 2, the sub-area 211 is rendered at a full pixel density. The sub-area 213 is rendered at ½ density. The sub-area 215 is rendered at ¼ density. And, the sub-area 217 is rendered at ⅛ density. When the first image is projected to a display 114 associated with the computing device 108, the computing device 108 may perform a post-rendering process, in which the first image 210 may become an image with complete pixel information. Thus, the displayed image 220 corresponding to frame t may have complete pixel information. The post-rendering process may also comprise warping operations, lens distortion corrections, chromatic aberration corrections, display corrections, or any suitable post-rendering operations. In particular embodiments, the computing device 108 may process the first image 210 with a machine-learning model during the post-rendering process. In particular embodiments, the computing device 108 may blend the pixels during the post-rendering process. In particular embodiments, the computing device 108 may render the entire first image 210 at a full resolution without utilizing a spatial foveated rendering technique. Although this disclosure describes rendering an image corresponding to a frame of a video stream in a particular manner, this disclosure contemplates rendering an image corresponding to a frame of a video stream in any suitable manner.

In particular embodiments, the computing device 108 may render a provisional image corresponding to a second frame of the video stream subsequent to the first frame. The provisional image may comprise a first area with complete pixel information and a second area with incomplete pixel information. The first area may be referred to as an inset. The second area may be referred to as outset. In particular embodiments, an eye tracking device may be used to track a user's gaze. In such a case, inset may be an area covering a central area of the user's field of view, and outset is an area covering an outer area of the user's field of view at a given time. In particular embodiments, the eye tracking device may not be used. Then a fixed eye model may be used, where inset and outset may be pre-determined regions in the rendered image. In particular embodiments, the second area of the provisional image may not be rendered. In particular embodiments, the second area of the provisional image may be rendered at a lower pixel density than a pixel density for the first area. As an example and not by way of limitation, continuing with a prior example illustrated in FIG. 2, the computing device 108 may render a provisional image 230 corresponding to frame t+n. The provisional image 230 may comprise an inset 231 and an outset 233. The outset 233 may be the rest of the inset 231 in the provisional image 230. If an eye tracking device is used, the inset 231 may be an area covering a central area of the user's field of view. Thus, inset for each frame may vary as the user's gaze location keeps changing. The outset 233 may be a remaining area of the inset 231 in the provisional image 230. When no eye tracking device is used, inset 231 may be a pre-determined region of the image. The computing device 108 may render the inset 231 of the provisional image 230 at a full resolution. Because the inset 231 is rendered at the full resolution, the inset 231 of the provisional image 230 may have complete pixel information. The computing device 108 may not render the outset 233 of the provisional image 230. In particular embodiments, the computing device 108 may render the outset 233 at a resolution lower than the resolution for the inset 231. After the rendering, the outset 233 of the provisional image 230 may have incomplete pixel information. Although this disclosure describes rendering an inset of an image in a particular manner, this disclosure contemplates rendering an inset of an image in any suitable manner.

In particular embodiments, the computing device 108 may generate a predicted image corresponding to the second frame by re-projecting at least an area of the first image according to one or more warping parameters. As an example and not by way of limitation, continuing with a prior example illustrated in FIG. 2, the computing device 108 may generate a predicted image 235 by re-projecting a region corresponding to the outset 233 of the first image 210. The predicted image 235 may not have pixel information for a region corresponding to inset 231. Although this disclosure describes generating a predicted image by re-projecting an area of an image corresponding to a previous frame in a particular manner, this disclosure contemplates generating a predicted image by re-projecting an area of an image corresponding to a previous frame in any suitable manner.

Figure 3:
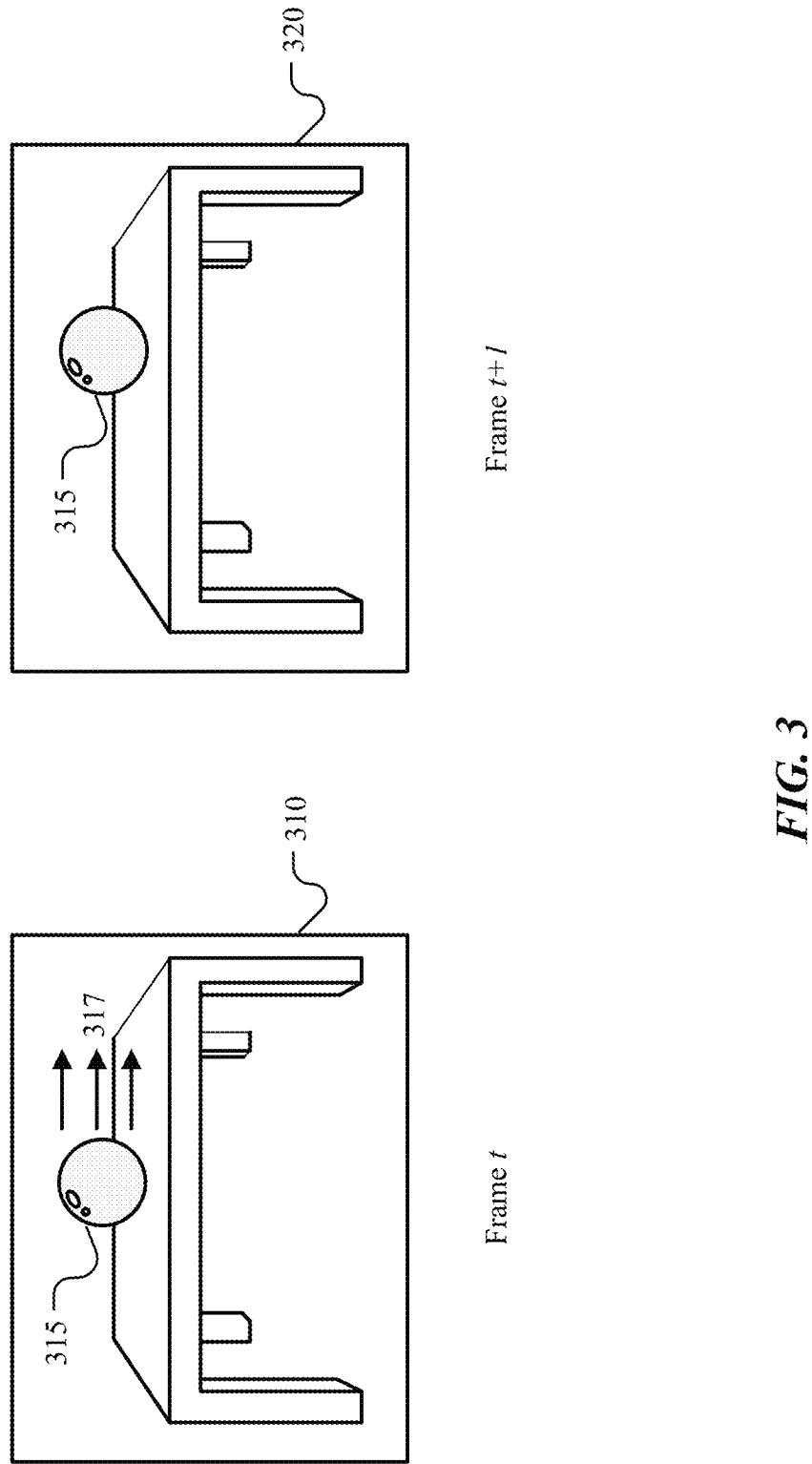
FIG. 3 illustrates a simplified example for applying space warping parameters.

In particular embodiments, the one or more warping parameters may comprise space warping parameters and time warping parameters. The computing device 108 may determine the space warping parameters based on motion vectors in the re-projected area of the first image. The space warping parameters may be used to generate an extrapolated image corresponding to a frame from images corresponding to previous frames. The motion vectors may be determined based on images corresponding to previous frames. In particular embodiments, determining the motion vectors may be based on optical flow. To apply the space warping parameters, the computing device 108 may distort the re-projected area of the first image such that objects in motion in the re-projected area are re-positioned using the determined motion vectors. In particular embodiments, determining space warping parameters may be performed on a hardware encoder, that is separate from a Graphics Process Unit (GPU). FIG. 3 illustrates a simplified example for applying space warping parameters. As an example and not by way of limitation, illustrated in FIG. 3, the computing device 108 may determine motion vectors 317 within an image 310 corresponding to frame t. As a ball 315 on the table rolls toward a direction in the previous frames, the computing device 108 may compute the motion vectors 317 based on the images corresponding to the previous frames. The computing device 108 may generate an extrapolated image 320 corresponding to frame t+n by distorting the image 310 corresponding to frame t such that the ball 315 is re-positioned to a new location. The new location for the ball 315 may be determined based on the determined motion vectors 317. The example illustrated in FIG. 3 shows the motion vectors 317 only for the ball 315 for brevity. Typically, the computing device 108 may determine motion vectors for a plurality of objects within an image. Although this disclosure describes applying space warping parameters in a particular manner, this disclosure contemplates applying space warping parameters in any suitable manner.

Figures 4A, 4B:
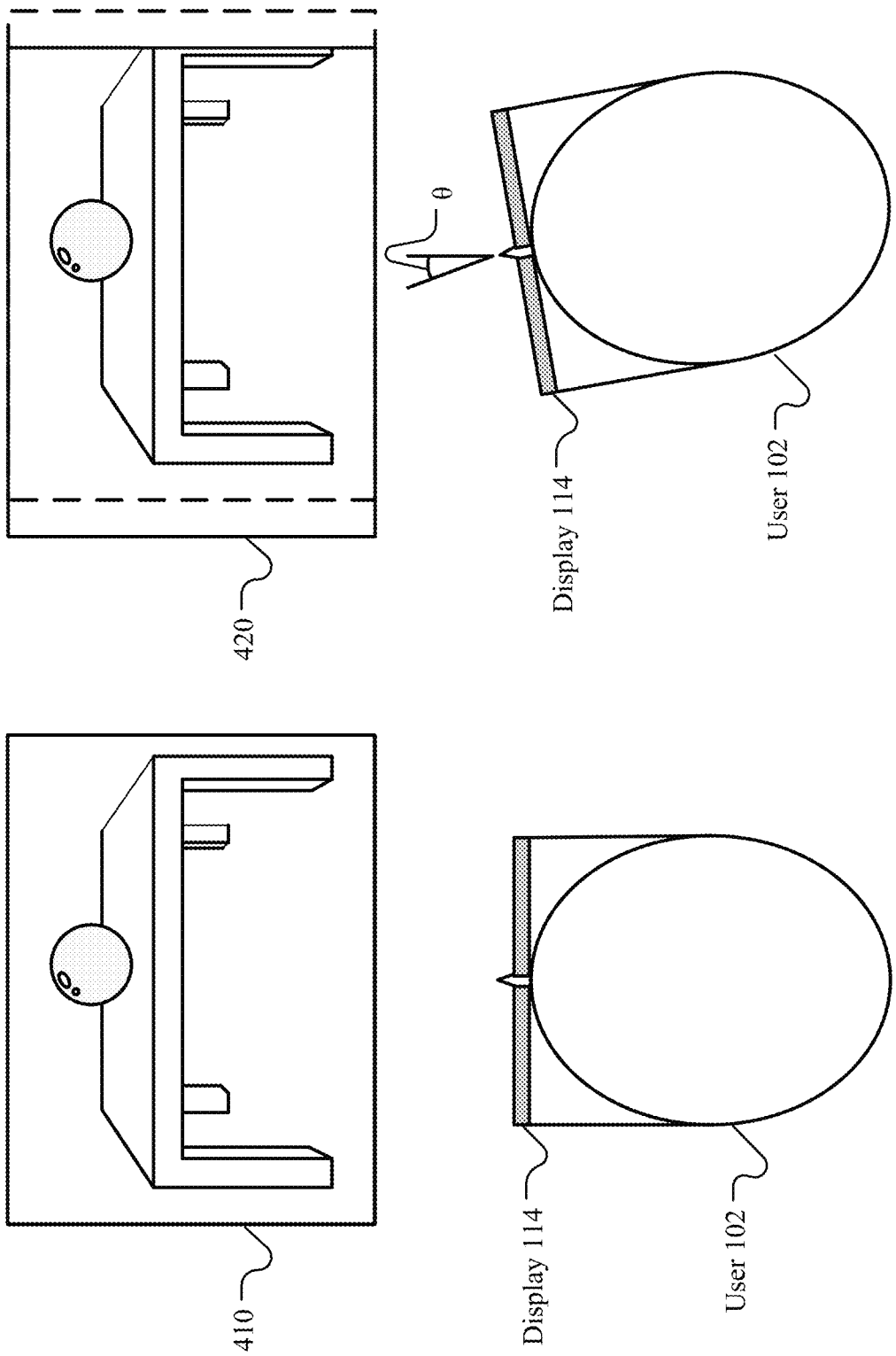
FIGS. 4A-4B illustrate a simplified example for applying time warping parameters.

In particular embodiments, the time warping parameters may be determined based on changes in head position. A user may move her head during a time period between a time instance of generating a scene and a time instance of displaying the scene to the user. A failure of compensating such head movement may break immersion. To compensate user's head position changes, the computing device 108 may compute time warping parameters based on the observed head position changes. When applying the computed time warping parameters to an image, the computing device 108 may shift the image to adjust for changes in head position. FIGS. 4A-4B illustrate a simplified example for applying time warping parameters. As an example and not by way of limitation, the computing device 108 may generate an artificial-reality scene at a time instance depicted at FIG. 4A. An image 410 that is supposed to be presented to a user 102 via a display 114 may be rendered based on a current head position of the user 102. FIG. 4B illustrates a time instance that the image is presented on the display 114. During the time period between the time instance of generating the artificial-reality scene and the time instance of presenting the image, the user may rotate her head by an angle θ. To compensate such a movement of the head, the computing device may adjust the image 420 by shifting the image 410 by an amount that corresponds to the head rotation angle θ. Although this disclosure describes applying time warping parameters in a particular manner, this disclosure contemplates applying time warping parameters in any suitable manner.

In particular embodiments, the computing device 108 may generate a predicted image corresponding to the second frame by re-projecting at least an area of the first image according to determined space warping parameters and time warping parameters. As an example and not by way of limitation, continuing with a prior example illustrated in FIG. 2, the computing device 108 may generate the predicted image 235 by re-projecting a region corresponding to the outset 233 of the first image 210. The predicted image 235 may not have pixel information for a region corresponding to inset 231. In particular embodiments, objects in motion within the re-projected area may be re-positioned in the predicted image 235 based on the determined motion vectors. In particular embodiments, the re-projected area may be shifted to adjust for changes in head position of the user between a time instance the first image is rendered and a time instance the second frame is displayed. Although this disclosure describes generating a predicted image by re-projecting an area of an image corresponding to a previous frame according to space warping parameters and time warping parameters in a particular manner, this disclosure contemplates generating a predicted image by re-projecting an area of an image corresponding to a previous frame according to space warping parameters and time warping parameters in any suitable manner.

In particular embodiments, the computing device 108 may generate a second image corresponding to the second frame by compositing the rendered provisional image and the predicted image. Compositing the rendered provisional image and the predicted image may comprise applying corresponding time warping parameters to the provisional image. In particular embodiments, compositing the rendered provisional image and the predicted image may comprise applying corresponding time warping parameters to the predicted image. As an example and not by way of limitation, continuing with a prior example illustrated in FIG. 2, the computing device 108 may generate a second image 240 corresponding to frame t+n by compositing the rendered provisional image 230 and the predicted image 235. In particular embodiments, as a procedure of the composition, the computing device 108 may apply the computed time warping parameters to the provisional image 230. The time warping parameters for the provisional image 230 may be computed based on a head movement of the user during the time period between a time instance of generating a scene for frame t+n and the time instance of the composition. In particular embodiments, as another procedure of the composition, the computing device 108 may apply the computed time warping parameters to the predicted image 235. The time warping parameters for the predicted image 235 may be computed based on a head movement of the user during the time period between a time instance of generating a scene for frame t and the time instance of the composition. Although this disclosure describes generating an image for a frame by compositing a provisional image and a predicted image in a particular manner, this disclosure contemplates generating an image for a frame by compositing a provisional image and a predicted image in any suitable manner.

Figure 5:
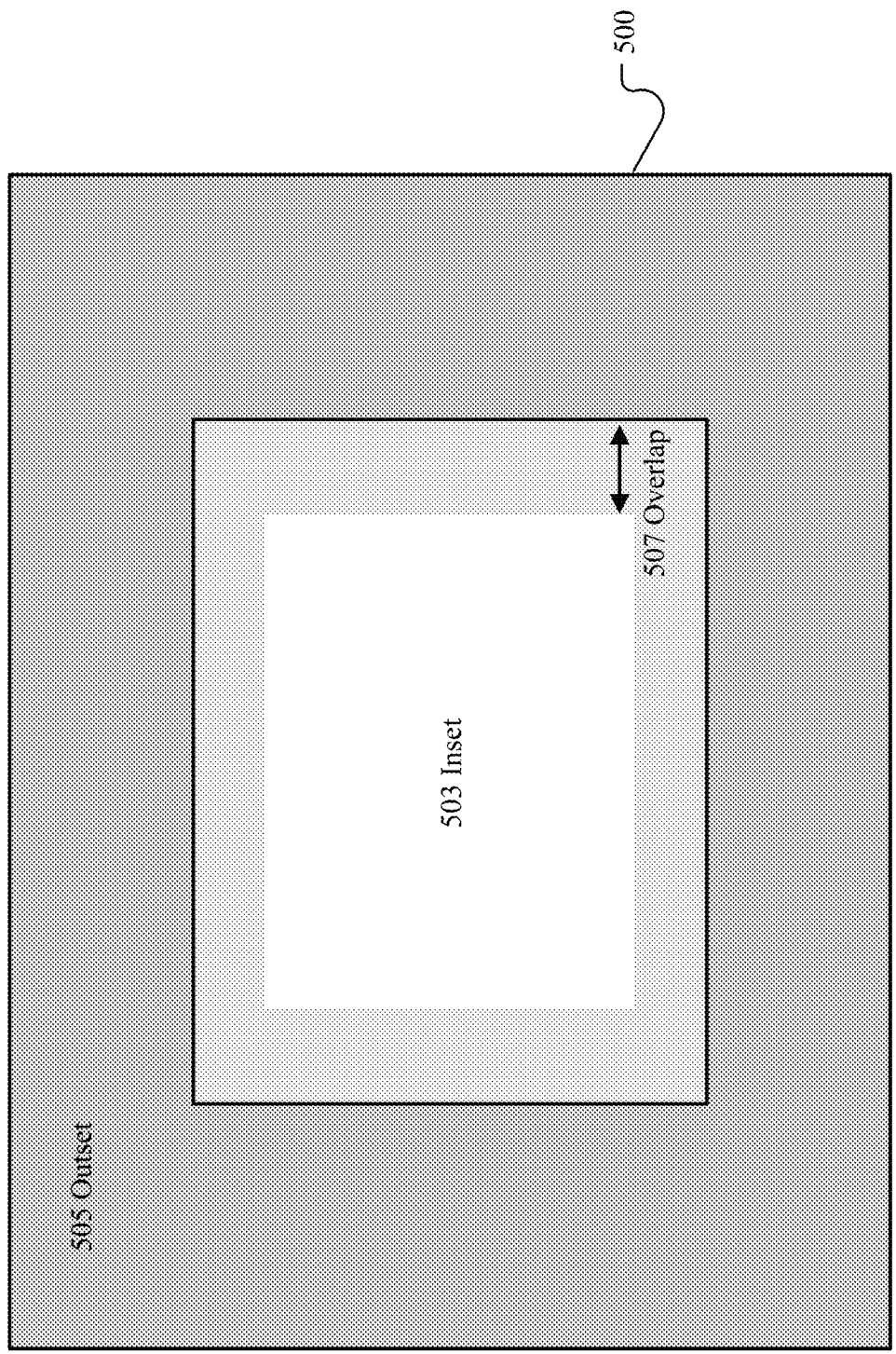
FIG. 5 illustrates an example overlap region between an inset and an outset.

In particular embodiments, a rendered area of the provisional image and the re-projected area of the predicted image may have an overlap region. Because different warping parameters are applied to the rendered area of the provisional image and the re-projected area of the predicted image, the two areas may not align perfectly after compositing the two images. To mitigate this problem, the computing device may determine the rendered area of the provisional image and the re-projected area of the predicted image in a way such that the two areas may have an overlap region. The computing device 108 may blend pixels within the overlap region while compositing the rendered provisional image and the predicted image. FIG. 5 illustrates an example overlap region between an inset and an outset. As an example and not by way of limitation, the computing device 108 may generate an image 500 by compositing a provisional image and a predicted image. The inset 503 of the image 500 may come from the provisional image. The outset 505 of the image 500 may come from the predicted image. The inset 503 and the outset 505 may have an overlap region 507. The computing device 108 may blend pixels within the overlap region 507 while compositing the rendered provisional image and the predicted image in a way such that a misalignment between the inset 503 and the outset 505 is minimized. Blending pixels within the overlap region 507 may also yield gradual changes between the rendered provisional image and the predicted image in various aspects. The various aspects may include, but not limited to, lighting, movements of virtual objects, reprojection errors due to the head movement, or any suitable differences between the rendered provisional image and the predicted image. Although this disclosure describes blending pixels within an overlap region while compositing a rendered provisional image and a predicted image in a particular manner, this disclosure contemplates blending pixels within an overlap region while compositing a rendered provisional image and a predicted image in any suitable manner.

Figure 6:
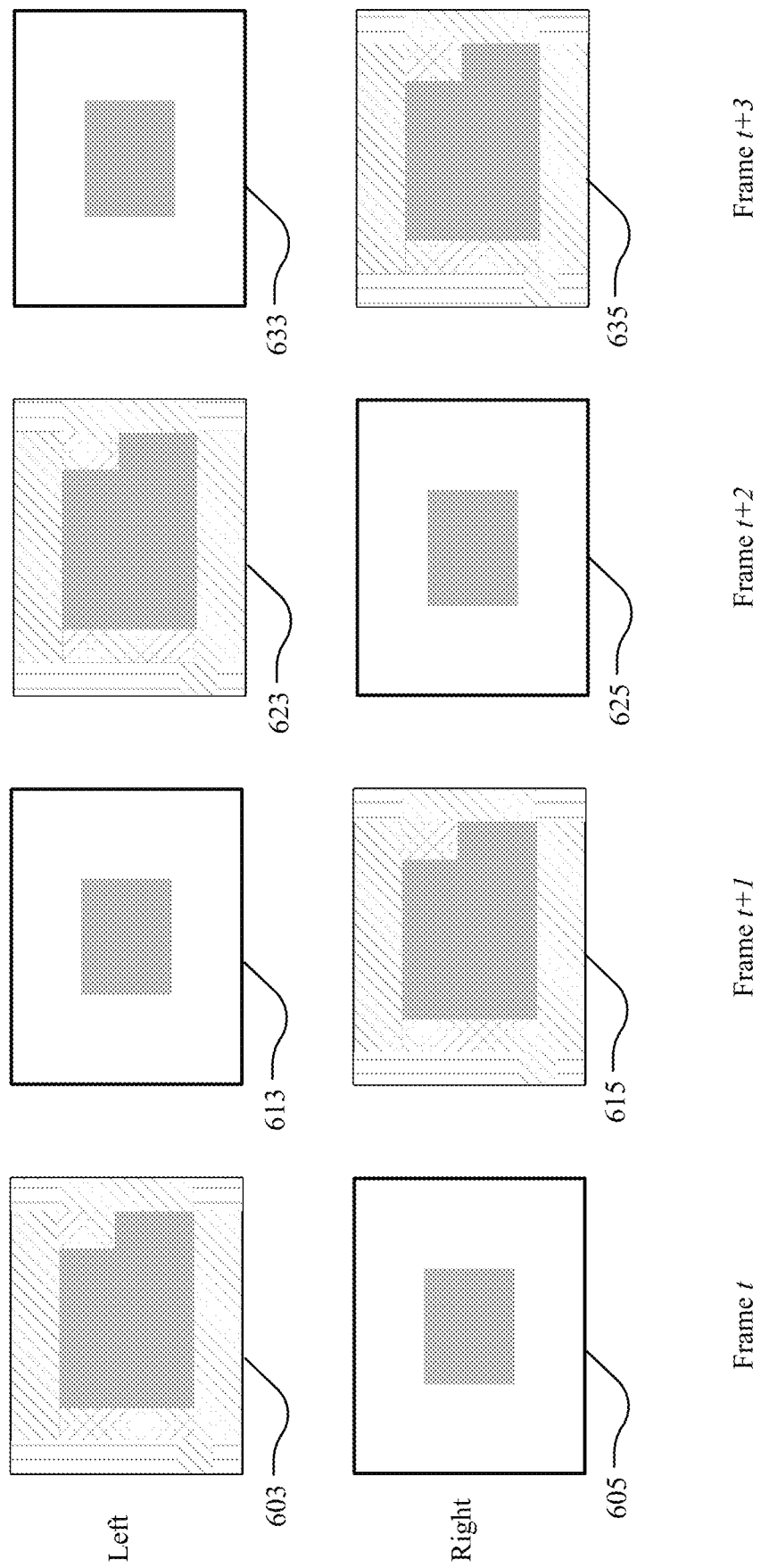
FIG. 6 illustrates an example temporal foveated rendering for both eyes.

In particular embodiments, the video stream may be a stereoscopic video stream. The computing device 108 may alternate generating an image corresponding to a frame of the video stream by compositing the rendered provisional image and the predicted image between eyes. The computing device 108 may render a whole image corresponding to the frame for the first eye while the computing device 108 may generate an image corresponding to the frame for a second eye by compositing the rendered provisional image and the predicted image. The whole image for the first eye may comprise a plurality of sub-areas. Each of the plurality of sub-areas may be rendered at a corresponding pixel density. The predicted image used for generating the image for the second eye may be generated by re-projecting an area of the image corresponding to a previous frame. FIG. 6 illustrates an example temporal foveated rendering for both eyes. FIG. 6 depicts eye buffers for left and right eyes for frames t, t+1, t+2 and t+3. For frame t, the computing device 108 may render a whole image 603 for left eye. The rendered whole image 603 may have a plurality of sub-areas, each of which is rendered at a corresponding pixel density. The computing device 108 may generate an image 605 for right eye by compositing a provisional image and a predicted image. The computing device 108 may render at least an area of the provisional image corresponding to frame t. The computing device 108 may generate the predicted image by re-projecting at least an area of the image corresponding to frame t−1. Frame t−1 is not shown in FIG. 6. For frame t+1, the computing device 108 may generate an image 613 for left eye by compositing a provisional image and a predicted image. The computing device 108 may render at least an area of the provisional image corresponding to frame t+1. The computing device 108 may generate the predicted image by re-projecting at least an area of the image 603 corresponding to frame t. The computing device 108 may render a whole image 615 for right eye. The rendered whole image 615 may have a plurality of sub-areas, each of which is rendered at a corresponding pixel density. For frame t+2, the computing device 108 may render a whole image 623 for left eye. The computing device 108 may generate an image 625 for right eye by compositing a provisional image and a predicted image generated by re-projecting at least an area of the image 615 corresponding to frame t+1. For frame t+3, the computing device 108 may generate an image 633 for left eye by compositing a provisional image corresponding to frame t+3 and a predicted image generated by re-projecting at least an area of the image 623 corresponding to frame t+2. The computing device 108 may render a whole image 635 for right eye. In summary, the computing device 108 may render an image for a first eye using a spatial foveated rendering technique while generating an image for a second eye using a temporal foveated rendering technique for a frame. For a subsequent frame, the computing device may alternate the foveated rendering technique for each eye. Although this disclosure describes alternating temporal foveated rendering for eyes over the frames in a particular manner, this disclosure contemplates alternating temporal foveated rendering for eyes over the frames in any suitable manner.

Figure 7:
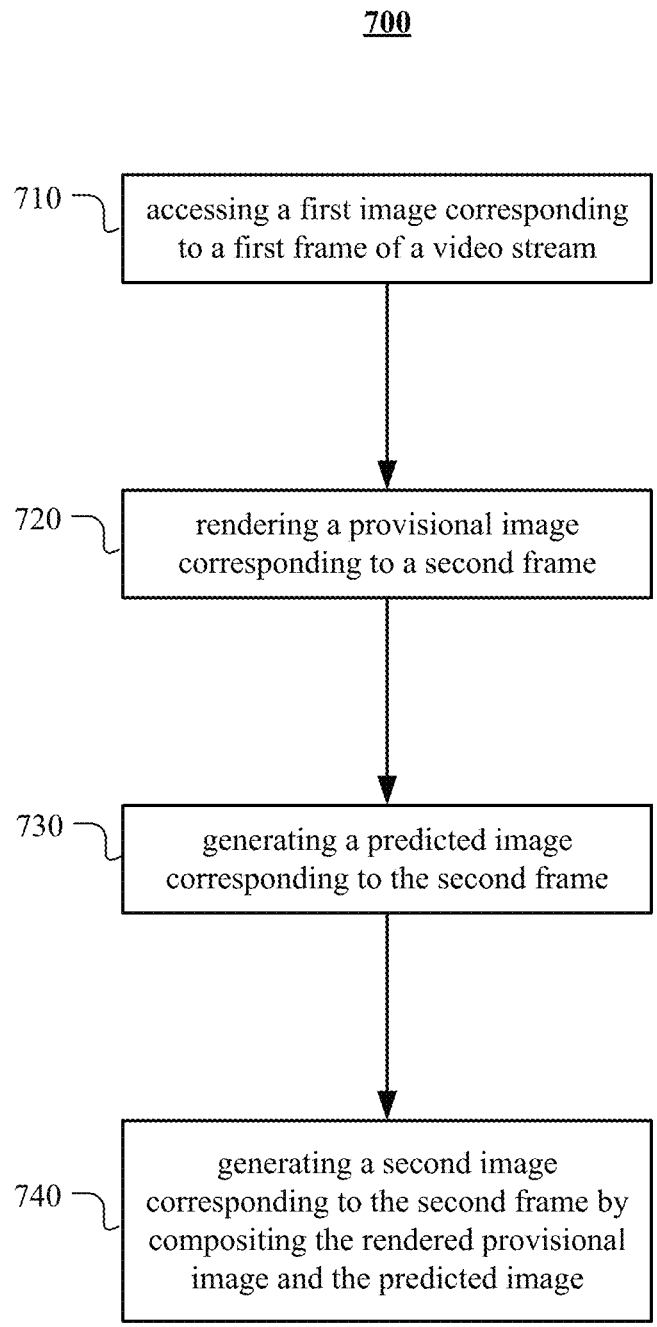
FIG. 7 illustrates an example method for generating an image corresponding to a frame of a video stream by compositing a rendered area and a re-projected area from an image corresponding to a previous frame.

FIG. 7 illustrates an example method 700 for generating an image corresponding to a frame of a video stream by compositing a rendered area and a re-projected area from an image corresponding to a previous frame. The method may begin at step 710, where the computing device 108 may access a first image corresponding to a first frame of a video stream. The first image may have complete pixel information. At step 720, the computing device 108 may render a provisional image corresponding to a second frame of the video stream subsequent to the first frame. The provisional image may have a first area with complete pixel information and a second area with incomplete pixel information. At step 730, the computing device 108 may generate a predicted image corresponding to the second frame by re-projecting at least an area of the first image according to one or more warping parameters. At step 740, the computing device 108 may generate a second image corresponding to the second frame by compositing the rendered provisional image and the predicted image. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating an image corresponding to a frame of a video stream by compositing a rendered area and a re-projected area from an image corresponding to a previous frame including the particular steps of the method of FIG. 7, this disclosure contemplates any suitable method for generating an image corresponding to a frame of a video stream by compositing a rendered area and a re-projected area from an image corresponding to a previous frame including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Systems and Methods

Figure 8:
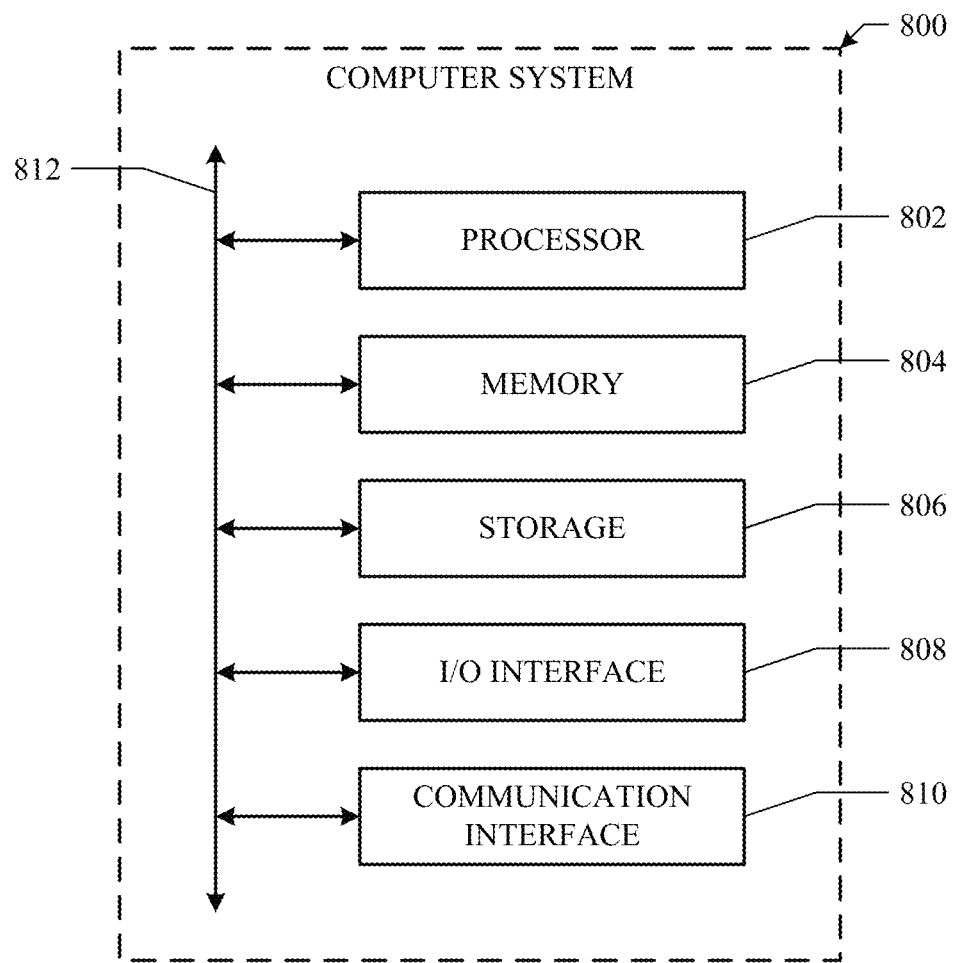
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
accessing a first complete image corresponding to a first frame of a video stream presented to a user wearing a head-wearable device, the first complete image having complete pixel information;
rendering a first provisional image corresponding to a second frame of the video stream subsequent to the first frame, the first provisional image having an inset area with complete pixel information and an outset area with incomplete pixel information;
generating a first predicted image corresponding to the second frame by re-projecting at least an area of the first complete image corresponding to the first frame that precedes the second frame according to one or more warping parameters; and
generating a first composite image corresponding to the second frame by compositing the rendered first provisional image and the first predicted image, wherein compositing the rendered first provisional image and the first predicted image comprises applying first time warping parameters to the first provisional image and applying second time warping parameters, different from the first time warping parameters, to the first predicted image.

2. The method of claim 1, wherein applying time warping parameters to an image comprises shifting the image to adjust for changes in head position, wherein the first time warping parameters are computed based on changes in head position during a first time period between a time instance of rendering the first provisional image and a time instance of compositing, and wherein the second time warping parameters are computed based on changes in head position during a second time period between a time instance of rendering the first complete image and the time instance of compositing.

3. The method of claim 1, wherein the one or more warping parameters comprise space warping parameters and time warping parameters.

4. The method of claim 3, wherein the space warping parameters are determined based on motion vectors in the re-projected area of the first complete image, wherein the motion vectors are determined based on images corresponding to previous frames.

5. The method of claim 4, wherein applying the space warping parameters comprises distorting the re-projected area of the first complete image such that objects in motion in the re-projected area are re-positioned using the determined motion vectors.

6. The method of claim 4, wherein determining the motion vectors is based on optical flow.

7. The method of claim 4, wherein determining space warping parameters is performed on a hardware encoder, that is separate from a Graphics Process Unit (GPU).

8. The method of claim 1, wherein a rendered area in the first provisional image and the re-projected area of the first predicted image have an overlap region.

9. The method of claim 8, wherein compositing the rendered first provisional image and the first predicted image comprises blending pixels within the overlap region.

10. The method of claim 1, wherein the inset area of the first provisional image comprises a central area of the user's field of view for the second frame of the video stream.

11. The method of claim 1, wherein the inset area of the first provisional image comprises a pre-determined area of an image.

12. The method of claim 1, wherein the outset area of the first provisional image is not rendered.

13. The method of claim 1, wherein the outset area of the first provisional image is rendered at a lower pixel density than a pixel density for the inset area.

14. The method of claim 1, wherein the first complete image comprises a plurality of sub-areas, and wherein pixel densities for the sub-areas are different from each other.

15. The method of claim 1, wherein the video stream is a stereoscopic video stream, and wherein the first complete image and the first composite image correspond to a first eye of the user.

16. The method of claim 15, wherein generating a composite image corresponding to a frame of the video stream alternates between eyes.

17. The method of claim 16, further comprising:
rendering a second complete image having complete pixel information corresponding to the second frame of the video stream;
rendering a second provisional image corresponding to a third frame of the video stream subsequent to the first frame, wherein the third frame follows the second frame in the video stream;
generating a second predicted image corresponding to the second frame by re-projecting at least an area of the second complete image according to one or more warping parameters; and
generating a second composite image corresponding to the third frame by compositing the rendered second provisional image and the second predicted image, wherein the second complete image and the second composite image correspond to a second eye.

18. A non-transitory computer readable storage medium storing one or more programs configured for execution by one or more processors, the one or more programs including instructions for:
accessing a first complete image corresponding to a first frame of a video stream presented to a user wearing a head-wearable device, the first complete image having complete pixel information;
rendering a first provisional image corresponding to a second frame of the video stream subsequent to the first frame, the first provisional image having an inset area with complete pixel information and an outset area with incomplete pixel information;
generating a first predicted image corresponding to the second frame by re-projecting at least an area of the first complete image corresponding to the first frame that precedes the second frame according to one or more warping parameters; and
generating a first composite image corresponding to the second frame by compositing the rendered first provisional image and the first predicted image, wherein compositing the rendered first provisional image and the first predicted image comprises applying first time warping parameters to the first provisional image and applying second time warping parameters, different from the first time warping parameters, to the first predicted image.

19. The non-transitory computer readable storage medium of claim 18, wherein applying time warping parameters to an image comprises shifting the image to adjust for changes in head position, wherein the first time warping parameters are computed based on changes in head position during a first time period between a time instance of rendering the first provisional image and a time instance of compositing, and wherein the second time warping parameters are computed based on changes in head position during a second time period between a time instance of rendering the first complete image and the time instance of compositing.

20. A system communicatively connected to a head-wearable device associated with a user comprising: one or more processors; and memory coupled to the processors storing one or more programs to be executed by the one or more processors, the one or more programs including instructions for:
accessing a first complete image corresponding to a first frame of a video stream presented to a user wearing the head-wearable device, the first complete image having complete pixel information;
rendering a first provisional image corresponding to a second frame of the video stream subsequent to the first frame, the first provisional image having an inset area with complete pixel information and an outset area with incomplete pixel information;
generating a first predicted image corresponding to the second frame by re-projecting at least an area of the first complete image corresponding to the first frame that precedes the second frame according to one or more warping parameters; and
generating a first composite image corresponding to the second frame by compositing the rendered first provisional image and the first predicted image, wherein compositing the rendered first provisional image and the first predicted image comprises applying first time warping parameters to the first provisional image and applying second time warping parameters, different from the first time warping parameters, to the first predicted image.

* * * * *